Dec. 13, 1949     A. S. DE VANY     2,490,785

LIQUID CONTACT TILT INDICATING SWITCH

Filed Jan. 8, 1948

INVENTOR.
ARTHUR S. DE VANY
BY M. A. Hayes
ATTORNEY

UNITED STATES PATENT OFFICE 2,490,785

LIQUID CONTACT TILT INDICATING SWITCH

Arthur S. De Vany, Inyokern, Calif.

Application January 8, 1948, Serial No. 1,209

6 Claims. (Cl. 200—152)

(Granted under the act of March 3, 1883, as amended April 30, 1928; 370 O. G. 757)

This invention relates to apparatus for indicating the deviation of an object from a predetermined attitude with respect to vertical.

It is an object of this invention to provide improved and simplified means for indicating when the attitude of an object changes with respect to vertical.

It is a further object of this invention to indicate not only the azimuth at which the deviation occurs, but also the magnitude of the deviation away from the predetermined attitude.

In accordance with this invention, there is provided a container made of insulating material having a chamber in the upper part which contains a conducting fluid such as mercury. A thin stream of mercury is allowed to flow from a hole in the bottom of the chamber in the manner of an hourglass. A plurality of electrodes are disposed in the lower part of the chamber in a generally horizontal stratum. These electrodes are arcuate in shape and are arranged in a series of concentric circles. The electrode at the very center of the group is simply a small circular disk, the other electrodes being arranged in arcuate, concentric fashion circumjacent the center electrode. When the container is disposed vertically, the stream of mercury flows from the upper chamber into the lower part of the container and strikes continuously against the center electrode. An upper electrode is dispersed in the pool of mercury, so that a circuit may be completed from the upper electrode, through the pool of mercury, the flowing stream of mercury, and any one of the plurality of electrodes in the lower portion of the container. This circuit is employed to control suitable mechanism for either measuring the deviation of the container from a vertical line or, alternatively to actuate mechanism which will return the container to a vertical position. Each of the several electrodes in the lower portion of the container is connected by means of individual conductors to an individual circuit, so that the azimuth and also the magnitude of the deviation from vertical may be indicated and proper compensation applied if desired.

A sump is formed at the bottom of the container to catch the mercury, which may be recirculated, if desired, by means of an outlet conduit, from which the mercury is pumped to an inlet conduit feeding the chamber containing the upper pool of mercury.

In order to assure that control will not be entirely lacking should the stream of mercury happen to drop in a space separating the control electrodes, a second plurality of electrodes of much larger cross section and therefore much fewer in number is provided below the first plurality of electrodes. Should the stream of mercury miss all of the first electrodes, it will fall on one of the second electrodes, which will give a coarse control suitable to start the compensatory action to return the container to vertical. When the mercury again strikes one of the small arcuate electrodes during the return of the container to vertical, the precise control will be re-established.

Referring to the drawing, a specific embodiment of this invention has been shown, wherein.

Figure 1:
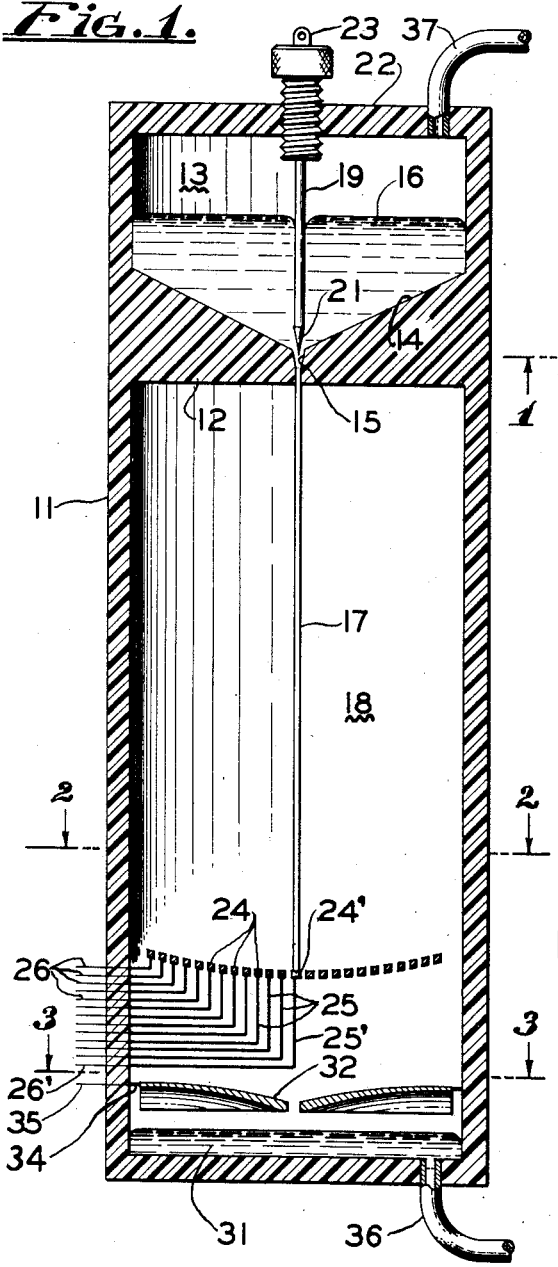
Fig. 1 is a longitudinal cross section of the device.

In Fig. 1, 11 designates a vertical cylindrical container of non-conducting material, having a horizontal partition 12, which forms a chamber 13 in the upper portion of the container. The bottom surface of the chamber 13 is conical as shown at 14, the apex of the cone terminating in a hole 15 by means of which a pool of mercury 16 held in the chamber 13 blows in the form of a thin stream 17 into the lower portion 18 of the container 11. Electrical communication with the mercury pool 16 is provided through an electrode 19 which also constitutes a needle valve pointed at its end 21 and terminating within the hole 15. The conducting member 19 is threaded into the top of the container 11 so that the valve may be adjusted vertically to regulate the volume of the mercury stream 17. At its upper end the member 19 is provided with an electrical terminal 23, to which may be connected a suitable electric circuit.

Figure 2:
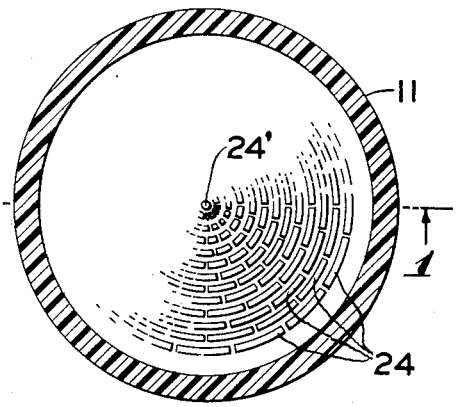
Fig. 2 is a vertical cross section taken along line 2—2 of Fig. 1.
Figure 3:
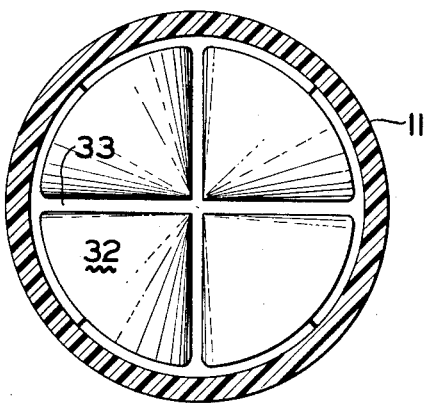
Fig. 3 is a vertical section taken along line 3—3 of Fig. 1.

Near the lower end of the lower portion 18 of the container 11 is a plurality of electrodes 24. The electrodes 24 occupy a generally horizontal stratum extending transversely across the cylinder 11. Specifically, the stratum in which the electrodes 24 are disposed is a portion of a sphere having its center at the hole 15, so that as the container is tipped the length of flow of the stream 17 is the same for all attitudes of the container 11. The center electrode 24' is circular, the remaining electrodes being in the form of arcuate members disposed in concentric circle circumjacent the center electrode 24', as shown in Fig. 2. Insulated conductors 25 are connected to the bottom of each of the electrodes 24 and 24', the conductors 25 extending generally radially through the wall of the cylindrical container 11, and terminating in a plurality of electrical terminals 26, which may be connected to the control circuit, the other end of which is connected to the terminal 23.

From the above description, it will be seen that as the mercury flows downwardly through the hole 15, forming the stream 17, a circuit is completed from the terminal 23 to one of the electrodes 24 or 24', and then to the exterior of the container 11, where it terminates with one of the terminals 26. This control circuit may be used to indicate the attitude with respect to vertical of the container 11, and may be further employed to control additional circuits which operate the mounting mechanism (not shown) for the container 11 to return the container to a vertical attitude. Should the container 11 be vertical, the circuit will be completed to the electrode 24'. If compensating mechanism is employed, this circuit may be used to anchor the mechanism in fixed position, so that the container 11 will not wobble. Should the container 11 be tipped, the azimuth and magnitude of the tilt will be indicated by the falling of the mercury stream 17 on one of the outlying electrodes 24. The circuit to which that particular electrode is connected will thus be brought into play, and the appropriate compensatory movement of the container 11 then takes place. Alternatively, this circuit may be used merely to indicate which of the electrodes 24 is being struck by the stream 17, thus indicating in discrete steps the azimuth and magnitude of tip imparted to the container 11.

Inasmuch as the mercury must be allowed to flow freely off each of the several electrodes 24 and down into a sump 31 at the bottom of the container, it is essential that the space between the several electrodes 24 be left open. This introduces the possibility that the mercury 17 might not hit any of the electrodes 24, but might pass through them completely. To meet this possibility a second stratum of electrodes 32 is provided, immediately below the first stratum of electrodes 24. The electrodes 32 consist simply of quarter segments covering substantially the entire cross sectional area of the container, the only open space being the four radial cracks 33 between the four electrodes 32. Each of the segments 32 is connected to a conductor 34, which extends exteriorly of the container 11 and terminates in a terminal 35. The top surface of each electrode 32 is sloped inwardly and also made convex so that the mercury will run freely from the electrode and fall into the sump 31.

While it is possible to employ the device for intermittent operation by simply filling the chamber 13 with mercury and allowing it to drop into the sump 31, it is preferred to provide for continuous operation by drawing the mercury from the sump 31 through an outlet conduit 32, and returning it to the chamber 13 through an inlet conduit 37.

Operation

The device described hereinbefore operates substantially as follows. The pool of mercury 16 in the chamber 13 flows in a thin stream 17 downwardly through the hole 15 and strikes one of the electrodes 24. A circuit is thus continuously completed from the terminal 23, through the conducting needle valve 19, the mercury pool 16, the mercury stream 17, one of the electrodes 24, through an insulated conductor 25, to a terminal 26. This circuit may be used to indicate the magnitude and azimuth of tip applied to the container 11, or may further be used to operate mechanism which will return the container 11 to a vertical attitude. Should the mercury stream miss all of the electrodes 24 and fall through the spaces therebetween, it strikes one of the electrodes 32, to complete an auxiliary circuit, to return the container 11 in non-precise manner to its vertical attitude. This return continuing only until the stream 17 again contacts one of the electrodes 24, at which time precise control of the compensating mechanism is re-established.

When the container 11 is exactly vertical, the mercury stream 17 strikes the center electrode 24', which establishes braking mechanism to hold the container in its vertical position.

It will be understood that this invention may be designed and utilized in any suitable shape, size of arrangement, depending upon the objects to be accomplished, and that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Apparatus of the class described, comprising a container, a chamber in the upper part of said container adapted to hold a conducting fluid, said chamber having a hole in the bottom communicating with the lower part of the container thru which the fluid may fall in a fine continuous stream into said lower part, an electrode in said chamber in electrical contact with the fluid extending exteriorly of said chamber to constitute an electrical terminal, a plurality of electrodes disposed in a generally horizontal stratum in said lower part of said container having unobstructed access to said hole, whereby the falling stream is free to establish electrical communication between the fluid in said chamber and any one of said electrodes, a plurality of conductors connected to the respective electrodes and extending to the exterior of said container, and a sump in said container below said plurality of electrodes.

2. Apparatus of the class described, comprising a container, a chamber in the upper part of said container adapted to hold a conducting fluid, said chamber having a hole in the bottom communicating with the lower part of the container thru which the fluid may fall in a fine continuous stream into said lower part, an electrode in said container in electrical contact with the fluid, extending exteriorly of said chamber to constitute an electrical terminal, a plurality of electrodes disposed in a generally horizontal stratum in said lower part of said container at equal distances from said hole whereby they lie on a spherical surface, said electrodes being arranged in a series of concentric circles and having unobstructed access to said hole, whereby the falling stream is free to establish electrical communication between the fluid in said chamber and any one of said electrodes, a plurality of conductors connected to the respective electrodes and extending to the exterior of said container, and a sump in said container below said plurality of electrodes.

3. Apparatus of the class described, comprising a container, a chamber in the upper part of said container adapted to hold a conducting fluid, said chamber having a hole in the bottom communicating with the lower part of the container thru which the fluid may fall in a fine continuous stream into said lower part, a first plurality of electrodes disposed in a generally horizontal stratum in said lower part of said container having unobstructed access to said hole whereby the falling stream is free to establish electrical communication between the fluid in said chamber and any one of said electrodes, a first plurality of conductors connected to the respective electrodes and extending to the exterior of said container, a second plurality of electrodes disposed in a general horizontal stratum below said first plurality of electrodes adapted to receive the falling stream should it miss said first plurality of electrodes, a second plurality of conductors connected to the respective second electrodes and extending to the exterior of said container, and a sump in said container below said second plurality of electrodes.

4. Apparatus of the class described, comprising a container, a chamber in the upper part of said container adapted to hold a conducting fluid, said chamber having a hole in the bottom communicating with the lower part of the container thru which the fluid may fall in a fine continuous stream into said lower part, a conducting needle valve and electrode extending downwardly into said chamber and terminating in said hole whereby to regulate flow of fluid thru said hole and to furnish electrical contact with the fluid in said chamber, a terminal on the upper portion of said needle valve, a plurality of electrodes disposed in a generally horizontal stratum in said lower part of said container having unobstructed access to said hole, whereby the falling stream is free to establish electrical communication between the fluid in said chamber and any one of said electrodes, a plurality of conductors connected to the respective electrodes and extending to the exterior of said container, and a sump in said container below said plurality of electrodes.

5. Apparatus of the class described, comprising a container, a chamber in the upper part of said container adapted to hold a conducting fluid, said chamber having a hole in the bottom communicating with the lower part of the container thru which fluid may fall in a fine continuous stream into said lower part, an inlet conduit communicating with said chamber, a conducting needle valve and electrode extending downwardly into said chamber and terminating in said hole whereby to regulate flow of fluid thru said hole and to furnish electrical contact with the fluid in said chamber, a terminal on the upper portion of said needle valve, a plurality of electrodes disposed in a generally horizontal stratum in said lower part of said container having unobstructed access to said hole, whereby the falling stream is free to establish electrical communication between the fluid in said chamber and any one of said electrodes, a plurality of insulated conductors connected to the respective electrodes and extending to the exterior of said container, a plurality of terminals on the respective exterior ends of said conductors, a sump in said container below said plurality of electrodes, and an outlet conduit communicating with said sump.

6. Apparatus of the class described, comprising a container, a chamber in the upper part of said container, said chamber having a hole in the bottom communicating with the lower part of the container, an inlet conduit communicating with said chamber, a pool of conducting fluid in said chamber adapted to fall in a fine continuous stream into said lower part, a conducting needle valve and electrode extending downwardly into said chamber and terminating in said hole whereby to regulate flow of fluid thru said hole and to furnish electrical contact with the fluid in said chamber, a terminal on the upper portion of said needle valve, a first plurality of electrodes disposed in a generally horizontal stratum in said lower part of said container, said first electrodes being arranged in a series of concentric circles and having unobstructed access to said hole, whereby the falling stream is free to establish electrical communication between the fluid in said chamber and any one of said electrodes, a first plurality of insulated conductors connected to the respective electrodes and extending to the exterior of said container, a first plurality of terminals on the respective exterior ends of said first conductors, a second plurality of electrodes disposed in a generally horizontal stratum below said first plurality of electrodes adapted to receive the falling stream should it miss said first plurality of electrodes, a second plurality of conductors connected to the respective second electrodes and extending to the exterior of said container, a second plurality of terminals on the respective exterior ends of said second conductors, a sump in said container below said second plurality of electrodes, and an outlet conduit communicating with said sump.

ARTHUR S. De VANY.

REFERENCES CITED

The following references are of record in the file of this patent:

UNITED STATES PATENTS

| Number | Name | Date |
| --- | --- | --- |
| 670,149 | Dodds | Mar. 19, 1901 |
| 830,730 | Marriott | Sept. 11, 1906 |
| 1,133,000 | Boury | Mar. 23, 1915 |
| 2,038,669 | Niles | Apr. 28, 1936 |
| 2,286,014 | Rowe | June 19, 1942 |
| 2,319,932 | Jacobs | May 25, 1943 |
| 2,402,396 | Hagner | June 18, 1946 |

FOREIGN PATENTS

| Number | Country | Date |
| --- | --- | --- |
| 441 | Great Britain | 1914 |
| 128,338 | Great Britain | 1919 |
| 188,696 | Great Britain | 1922 |